May 30, 1939.   C. NORDMANN   2,160,340
METHOD AND DEVICE FOR OBTAINING OR REPRODUCING COLOR PHOTOGRAPHS
Filed Oct. 5, 1936
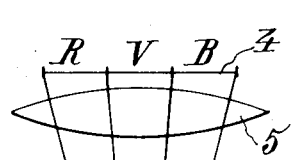
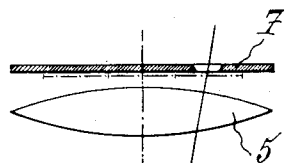
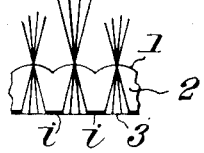
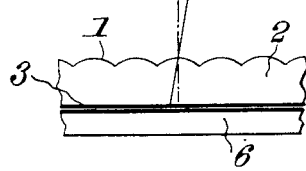
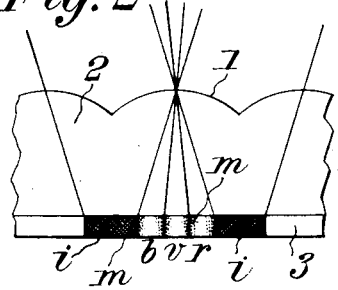
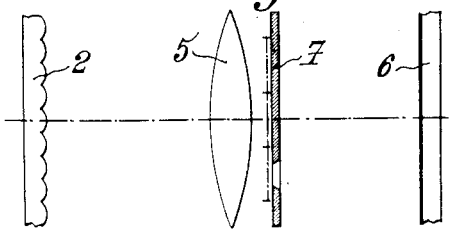
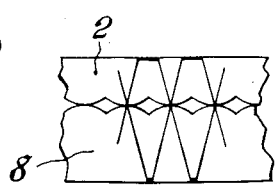
Inventor:
Charles Nordmann
Attorneys Patented May 30, 1939

2,160,340

UNITED STATES PATENT OFFICE 2,160,340

METHOD AND DEVICE FOR OBTAINING OR REPRODUCING COLOR PHOTOGRAPHS

Charles Nordmann, Paris, France

Application October 5, 1936, Serial No. 104,131
In France October 7, 1935

5 Claims. (Cl. 88—24)

The present invention relates to methods and devices for obtaining or reproducing color photographs of the so-called "lenticular" type, especially with reference to projection for spectacular purposes, for the obtainment of color pictures visible by reflection or transparency, or for the preparation of selected plates for multi-color printing.

It is known that, in color photography making use of lenticular supports and of an objective fitted with a selecting filter (a polychromatic and generally a trichromatic filter) a small image of this filter is formed in the sensitive layer behind each lenticular element. Up to the present time, for the taking of photographs of this kind, use was always made of relative objective apertures substantially equal or slightly smaller than the relative aperture of the small lenses which constitute the lenticular elements above referred to, in such manner that the successive images of the filter behind two small contiguous lenses do not overlap each other and are separated by a small space which is not acted upon by light. After inverting, and in the case of a cylindrical lenticular formation, these spaces form small black bands separating from one another the utilized fields of the small lenses. The use of substantially smaller objective apertures has never been considered as possible, because this would involve giving a much greater width to these intermediate bands, which, in the case of a positive picture, would add black to the colors that are reproduced and create a prohibitive darkening of the photograph obtained.

These intermediate bands therefore constitute, in lenticular photographs, spaces which are detrimental of the good quality of the projection or reproduction.

On the other hand, I have found experimentally that, in the reproduction of a color lenticular photograph (whether it is desired to project it, or to make a lenticular copy thereof, or again to obtain selected prints or plates for color printing) the selection and the vivacity of the colors obtained in the reproduction are greatly improved when use is made, not the whole width of the small monochromatic images of the bands of the filter located behind each element of the lenticular structure of the photograph to be reproduced, but only a portion of this width, and especially the central portion thereof, excluding the whole or a part of the margins thereof, that is to say of the portion of these images which, due to diffusion and diffraction, is not sharply limited and is not so dense as the central portion, in the case of a negative, and less transparent in the case of a positive.

It follows that the marginal portions, affected by diffraction and optical and photographical diffusion, of the microscopic images of the filter bands behind each lenticular element, also constitute spaces detrimental of the quality of the projection of color lenticular photographs or their reproduction.

The object of the present invention is to eliminate or to reduce the drawbacks resulting from the detrimental spaces thus constituted on these photographs, on the one hand by the intermediate bands located behind the successive microscopic images of the filter employed for taking the picture and, on the other hand, by the marginal portions of the monochromatic images of each band of this filter.

The invention consists essentially in effecting the reproduction (by copy or by projection) of color photographs of the lenticular kind in such manner that the detrimental spaces, that is to say the intermediate bands and/or the marginal portions above referred to, occupy, either as a whole or separately, an area which relative to the photographed subject, is smaller on the reproduction than on the photograph to be reproduced.

The invention thus permits not only of obtaining a better result from lenticular photographs obtained, in the usual manner, with objectives of great aperture, which photographs had been, up to this time, useless for certain applications, such for instance as polychromatic printing, but also of taking, in a useful manner, pictures on lenticular elements with objectives of small aperture, and of reproducing them in an efficient manner, that is to say of solving the problem (considered up to now as impossible) of taking color pictures on lenticular elements with a great depth of the field.

According as the case may be, and, for instance, according as the photograph to obtain or to reproduce is a negative or a positive, the detrimental spaces such as above described may be more or less transparent, and even opaque in the case of an inverted or positive lenticular film. On the other hand, the object of the invention, which is to reduce, on the reproduction, the relative area of these detrimental spaces, includes devices which may be different according as the case may be. These devices will for instance vary according as each reproduction is itself a lenticular reproduction of all the monochromatic bands of the filter (case of cinematographic pictures) or a reproduction of only one of them (case of polychromatic printing and of color prints obtained by superimposition).

For practical purposes, the devices which permit, according to the present invention, of obtaining the desired result, consist in reducing the relative area of the detrimental spaces on the reproduction and in comparison with the photograph that is reproduced. Such is the case, for instance, of the arrangements hereinafter described.

Preferred embodiments of the present invention will be hereinafter described, with reference to the accompanying drawing, and merely by way of example. In the drawing, Fig. 1 diagrammatically shows how the pictures are taken on lenticular elements;

Fig. 2 shows, on an enlarged scale, the locations of the detrimental spaces on such a photograph;

Fig. 3 diagrammatically shows an embodiment of a device according to the invention for the reproduction, by contact, corresponding to one of the bands of the filter, of a photograph obtained as indicated by Fig. 1;

Fig. 4 diagrammatically shows an embodiment according to the invention, for a reproduction of the same kind, performed by projection;

Fig. 5 diagrammatically shows an embodiment according to the invention, for the complete reproduction, by projection, of a lenticular photograph on a photographic element of the same nature;

Fig. 6 diagrammatically shows an embodiment according to the invention, for the complete reproduction, by contact, of a lenticular photograph on a photographic element of the same nature.

In these figures, the proportions have been modified for the sake of clarity, the figures being merely diagrammatic.

In Figs. 1 and 2, I have diagrammatically shown in what manner are formed, behind each lenticular element 1 of support 2 on sensitive layer 3, the images r, v and b of the bands R, V and B of filter 4, utilized for taking pictures and with which objective 5 is fitted. The dark portions i correspond to the intermediate bands between the successive images of the filter and portions m (in dotted lines) correspond to the marginal portions of the images r, v, b of each monochromatic band R, V, B of the filter. The same reference characters have been utilized on the other figures for designating analogous elements.

According to the invention, I may, during reproduction, make use, for instance, of a device which illuminates only the median part (excluding the marginal portions) of each monochromatic image of the bands of the filter on the lenticular part to be reproduced. I may also make use of a device which intercepts, either wholly or partly, in the light beam from the whole surface of this monochromatic image, the rays coming from the marginal portions of this image.

If it is desired to obtain, from the lenticular color photograph, monochromatic prints or printing plates, I may, for instance as shown by Fig. 3, place the lenticular photograph to be reproduced opposite the objective 5 that has served to take the picture and in the same position as it occupied when said picture was taken. The diaphragm which carried this filter for taking the picture is now advantageously free from said filter. In contact with the sensitive layer 3 of the photograph, I place the photographic film or plate 6 on which the monochrome image is to be formed. If it is desired for instance to obtain a printing plate for yellow ink, corresponding to the portion of the lenticular photograph taken through the blue band of the filter, I fully obturate the portion of diaphragm 7 that was occupied by the other bands of the filter, and, furthermore, I partly obturate the lateral portions (with respect to the direction of the lenticular elements) of the portion of the diaphragm that carried the blue band of the filter. Then I direct, for instance, the objective toward a suitably illuminated white surface so located that the objective forms its image upon the sensitive layer and I print in this way the desired monochromatic image upon the sensitive layer of 6.

For the same purpose of obtaining separate monochromatic copies and if it is desired to apply the method of reproduction by optical projection proposed by me for copying lenticular films (French Patents No. 699,392, corresponding to United States Patent No. 1,940,503, and 751,414), I cut off, as shown by Fig. 4, by means of a diaphragm 7 located substantially in the plane of intersection of the axes of the elementary beams of the photograph to be reproduced, all the beams, excepted those corresponding to the median portion (but not to the marginal portions) of the monochrome that is considered.

The same method applies advantageously to the optical and complete reproduction of the three monochromes of a lenticular photograph upon a photographic element of the same nature, for instance according to the methods I set forth in my French Patents Nos. 699,392 and 751,414. I may thus improve, on these optical reproductions, the sharpness of the colors of all the monochromes or of some monochromes as it is desired, through the step that consists in obturating or cutting off totally or partially the beams corresponding to their marginal portions.

In this latter case, and in order that the relative intensities of the three monochromes may not be altered by the fact that the beams corresponding to the marginal portions of only one or two monochromes are cut off, it suffices, for instance, to obturate to a corresponding amount the whole width of the other monochrome or monochromes.

According to the present invention, and as I have found from experience, the results obtained more especially in the application of the preceding arrangement to the art of polychromatic printing are of better quality, from the point of view of selection and of the sharpness of colors, when one operates in such manner that the photograph to be reproduced is preferably an inverted negative or a positive, or again a negative carrying, by superimposition, opaque separations between the microscopic successive images of the film (according to the devices I set forth in my French Patent No. 778,340). Thus I eliminate the disturbing influence of imperfectly directed light which comes from the intermediate bands constituted by these separation zones when, as it is the case with ordinary lenticular negatives, these zones are transparent.

Now, if it is desired to obtain, from a lenticular color potograph and for all monochromes at the same time, a lenticular copy in which the intermediate bands located between the microscopic images of the filter must occupy an area which is proportionally smaller than on the photograph to be reproduced, I may for instance operate in the following manner:

It is supposed, for instance, that it is desired to obtain the reproduction, at the same size, by means of the optical system precedingly described by me, in the patents above mentioned, of a photograph.

Under these conditions, I found that, in order to obtain the desired result above mentioned, it suffices (Fig. 5) that the lenticular elements of copy 8 should have a smaller relative aperture than those of the photograph to be reproduced 2. In other words, the ratio of the aperture of a lenticular element and of the focal length thereof must be smaller in the case of copy 8 than in the photograph 2 to be reproduced. In the case that is considered (magnification equal to one) the angular field α occupied behind each lenticular element by the image of the selecting filter is the same on copy 8 as on the photograph 2 that is copied. Consequently, it is clear that if one calls "field of a lenticular element" the fraction of the sensitive layer that corresponds to each lenticular element (and the width of which is equal to that of said element in the case in which the lenticular elements adjoin each other) the image of the selecting filter will occupy on copy 8 a portion of the field of the lenticular elements greater than on the photograph 2 that is copied.

In order to show that, in this embodiment of the invention, the only thing to matter is the relative aperture of the elementary lenses of the films or plates that are utilized, I gave on purpose, on Fig. 5, to the small lenses of copy 8, an absolute aperture greater than the absolute aperture of the small lenses of the photograph 2 that is copied, whereas the relative aperture of the small lenses 8 is on the contrary smaller than that of small lenses 2.

In order to obtain the result above indicated in a correct manner, I found, on the other hand, that it is necessary that, during reproduction, no light from the intermediate bands of the photograph that is copied, these bands being located between the microscopic successive images of the filter, should reach the copy. According to the invention, this result is obtained, for instance, by inverting the photograph to be copied, which blackens these intermediate bands or by a superimpression of these intermediate bands, obtained according to the methods I described in my French Patent 778,340 or in any similar manner.

To sum up, in the optical reproduction of color photographs of the lenticular type on elements of the same nature, it is possible to obtain the result according to my invention, for instance, on the one hand, by masking means of a copy-lenticulation the relative aperture of which is smaller than that of the lenticulation of the photograph that is reproduced, and, on the other hand, by acting in such manner that no light coming from the intermediate bands thereof reaches the copy.

In the case in which such a reproduction is made with a magnification different from one, the angular apertures of the beams that form the microscopic images of the filter or coming from these images are no longer the same for the original and for the copy. If the copy is reduced in size, the corresponding angular aperture is greater for the copy than for the photograph that is copied and it is, on the contrary, smaller, if the copy is magnified. It follows that, other things being equal, the desired result will be obtained provided that the relative aperture of the lenticular elements of the copy is given a value such that, multiplied by the magnification factor of the copy, it gives a number smaller than the relative aperture of the lenticular elements of the photograph that is copied.

In the case in which it is desired to obtain such a reproduction by applying the "contact" method, (and in this case only a magnification equal to one can be obtained) I may for instance, as shown by Fig. 6, obtain the desired result by placing in contact with each other, with the elementary lenses facing one another, the photograph to be copied 2 and the copy 8, by giving the lenticular structure of photographic element 8 on which the copy is made the same absolute aperture but a smaller relative aperture than for the photograph that is copied, to wit 2. In other words, the copy and the photograph to be reproduced will have substantially the same number of lenticular elements per millimeter but, if their supports are made of the same matter, the support of copy 8 will be thicker than of the copied photograph 2. As in the cases above studied, it is necessary to operate in such manner that no light comes from intermediate bands of the photograph 2 to be copied.

In the case in which the copies of color photographs of the lenticular type are intended to make prints of plates for polychromatic printing it is no longer necessary that, as in the preceding case, these copies should themselves be lenticular. On the other hand, each copy must only carry the image corresponding to each of the bands of the selecting filter that has been used for taking the pictures.

In this case, it is possible, according to the object of the invention, to obtain, in various ways, reproductions in which the intermediate bands occupy an area proportionally smaller than on the photograph that is reproduced.

I consider, for instance (without this example having a limitative character), the case in which the lenticular color photograph which is to be reproduced is placed, gelatin against gelatin, substantially in contact with the photographic element intended to constite the printing plate of one of the monochromes. I further suppose that the photograph to be copied is illuminated by means of a suitable optical system which allows only light corresponding to this monochrome to pass. In this case, according to the invention, I obtain the desired result by interposing between layer 3 carrying the photograph to be copied and the sensitive layer of 6 on which the copy is to be made, a thin transparent layer (for instance of air, of Cellophane, etc.) of suitable thickness and such that each monochrome line of the original forms on the copy its enlarged image. The best result is obtained when this enlarged image is caused to occupy on the copy substantially the whole of the width corresponding to that of a lenticular element of the photograph that is copied. Thus the influence of the detrimental spaces constituted by the intermediate bands is eliminated, without reducing for this cause the sharpness of the copy the power of definition of which remains, as in the photograph that is copied, limited by the width of a lenticular element. I may obtain the same result through various other means. For instance in the case in which the monochromatic copy is obtained by optical projection according to a method above set forth, I obtain the said result by slightly and suitably modifying the focussing of the image formed on the copy. In all cases, it will be advantageous, as in the other cases above considered, to prevent, by inverting or superimpression of the photograph that is copied, or through any other means giving the same result, that, during the copying operation, light from the intermediate bands may strike the copy.

Among the various applications of the invention that has just been described, the following one is particularly interesting: It makes it possible to get rid of the difficulties that greatly limited, up to this time, the possibilities of application and of utilization of lenticular color photographs and films.

The results from the fact that pictures taken on photographs and films of this type, could, up to the present time, be obtained only by means of objectives of very large relative aperture (averaging at most f/3). The reason is that the relative aperture of the lenticular elements of photographs and of films of this kind cannot be made substantially smaller than this value because of the limited power of definition of the sensitive layers. It follows that, by making use, on taking the picture, of relative objective apertures substantially smaller lenticular photographs would have been obtained in which the intermediate bands not lighted when taking the pictures would have occupied a considerable area of the surface. Therefore, and after inverting the print, these photographs would have been very dark and could not have been projected on a screen.

As a matter of fact, the objective apertures (considered in a plane at right angles to the plane of lenticulation) which have been employed up to this time for taking lenticular photographs have always been greater than f/4 and the ratio of the relative aperture of the objective that is employed and of the relative aperture of the minute lenses of the lenticular structure has always been greater than 1/2. With the present invention lenticular color pictures with objective apertures smaller than f/4 and with a ratio smaller than 1/2 of the relative apertures of the lenticular structure and of the objective have now become not only possible but also desirable and advantageous, the possibility of taking usefully such pictures being a direct consequence of the invention.

The obtainment of lenticular color photographs by means of objectives of small relative aperture (a result which was never looked for up to this time and is claimed by me) will supply documents which can be used widely. As above explained, the present invention will permit of obtaining from the lenticular color photographs and films taken under these conditions copies in which the intermediate bands will be reduced as such as it is desired and which, consequently, will be used with advantage as well for projection purposes as for polychromatic printing and the obtainment of color prints.

Through the particular application which is thus made, the present invention liberates industry from the difficulties which, especially concerning the field depth, the focus depth and the width of the field, considerably limited, up to this time, the use of lenticular color photographs and films.

In a general manner, while I have, in the above description, disclosed what I deem to be practical and efficient embodiments of the present invention, it should be well understood that I do not wish to be limited thereto as there might be changes made therein without departing from the principle of the present invention as comprehended within the scope of the appended claims.

What I claim is:

1. A method of color reproduction from a lenticular photographic element the elementary lenses of which have a given relative aperture, which comprises applying against said element, with the lenticulations facing another, another lenticular element the elementary lenses of which have the same absolute aperture as the first mentioned lenticular element, and the sensitive surface thereof being spaced from the lenticular surface thereof a greater distance than the corresponding surfaces of said first named lenticular elements to provide therein a smaller relative aperture, and passing light through said first named element to the sensitive surface of said second named element.

2. A method of photographically copying a lenticular photographic element having lenticulations with predetermined absolute apertures upon a second lenticular photographic element of greater thickness, and having lenticulations with the same absolute apertures, and with the emulsion at the side opposite the lenticulations comprising closely disposing the lenticulations of the elements in opposition and passing light through the elements.

3. A method of photographically copying a lenticular photographic element having lenticulations with predetermined absolute apertures upon a second lenticular photographic element having lenticulations with equal absolute apertures, comprising spacing the two elements from one another with their lenticulations facing and passing light through said first named element to the sensitive surface of said second named element, the distance between the lenticular surface and sensitive surface of said second named element being greater than the distance between the corresponding surfaces of the first named element to make the relative aperture of said second named element less than the relative aperture of said first named element.

4. A method of photographically copying a lenticular photographic element having lenticulations with predetermined absolute apertures upon a second lenticular photographic element having lenticulations with equal absolute apertures, comprising spacing the two elements from one another with their lenticulations facing and passing light through said first named element and an optical system to the sensitive surface of said second named element, the distance between the lenticular surface and sensitive surface of said second named element being greater than the distance between the corresponding surfaces of the first named element to make the relative aperture of said second named element less than the relative aperture of said first named element.

5. A method of color reproduction from a lenticular photographic element having lenticulations upon a second lenticular photographic element comprising spacing the elements with their lenticulations facing and optically projecting with a given magnification an image of said first named element on said second element, the distance between the lenticular surface and sensitive surface of said second element being spaced at such greater distance than the corresponding surfaces of said first element as to provide in said second element a relative aperture which when multiplied by the factor of magnification gives a value smaller than the relative aperture of said first named element.

CHARLES NORDMANN.